(No Model.)
J. DUCKWORTH & E. SMITH.
COMBINED PROTRACTOR, SQUARE, AND BEVEL.
No. 282,966. Patented Aug. 14, 1883.
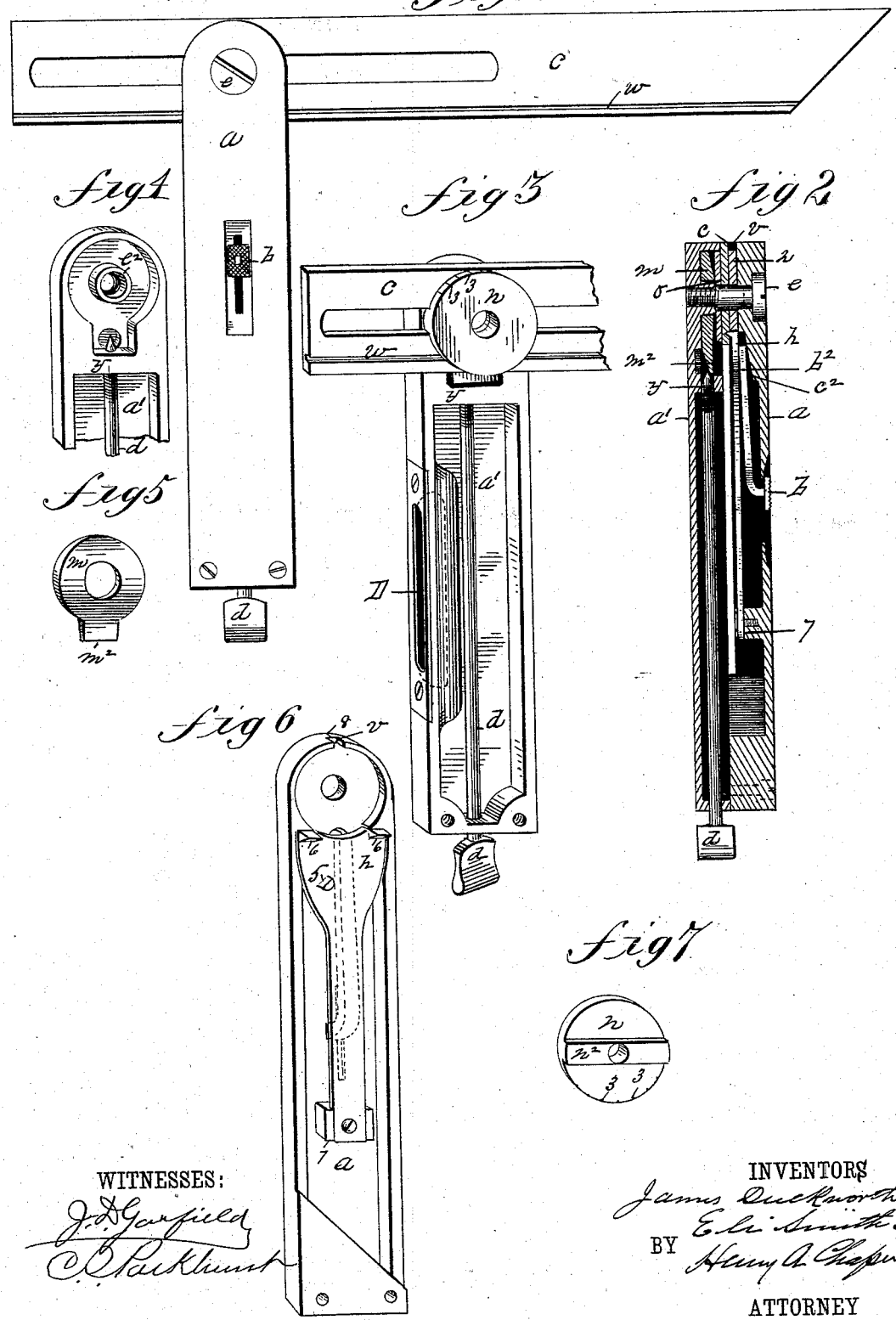
WITNESSES:
INVENTORS
BY
ATTORNEY

UNITED STATES PATENT OFFICE.

JAMES DUCKWORTH AND ELI SMITH, OF SPRINGFIELD, MASSACHUSETTS.

COMBINED PROTRACTOR, SQUARE, AND BEVEL.

SPECIFICATION forming part of Letters Patent No. 282,966, dated August 14, 1883.

Application filed June 22, 1883. (No model.)

*To all whom it may concern:*

Be it known that we, JAMES DUCKWORTH and ELI SMITH, citizens of the United States, residing at Springfield, in the county of Hampden and State of Massachusetts, have invented new and useful Improvements in Combined Protractor, Square, and Bevel, of which the following is a specification.

This invention relates to an improved tool consisting of a protractor, square, and bevel combined in one instrument, provision being also made in the same tool to embody therein a level, the object being to embrace in an ordinary bevel all of the above-mentioned devices, combining therewith improved mechanism for locking the blade at right angles to the stock and for setting an angle-stop therefor for indicating any desired angle of incline of the blade and for locking the latter in any position.

In the drawings forming part of this specification, Figure 1 is a side elevation, and Fig. 2 is a longitudinal section, of a tool constructed according to our invention. Figs. 3, 4, 5, 6, and 7 are detail views.

In the drawings, $a$ $a'$ are the two parts of the stock of the tool which inclose the slotted blade $c$ between them in the usual manner, the screw $e$ passing through the ends of the stock parts and the slot in the blade, serving as a point upon which the blade swings to different angles. The blade $c$ is provided with a groove, $w$, near one edge and parallel therewith.

The side $a$ of the stock has on its interior a boss, 7, to which is secured, as shown, a blade-holder, $h$, having on its free end two teeth, 6 6, and on its face, near the latter, a blade-stop, 5. The blade-holder is capable of having a vibratory movement given to its free end by means operative from the outside of the stock, and the means herein shown consist of a tongue, $b^2$, one end of which lies between an inclined surface, $c^2$, on the stock and the adjoining side of said holder. The opposite end of the tongue $b^2$ is bent and made to project through a slot in the stock, and has attached thereto a roughened plate, $b$. Sliding plate $b$ toward the blade $c$ drives the end of tongue $b^2$ between the holder $h$ and the incline $c^2$, making the end of the holder on which are teeth 6 spring toward blade $c$, and when the latter is in a right-angle position, as in Fig. 1, causing said teeth to enter the groove $w$ in the blade and hold the latter in that position. By drawing tongue $b^2$ back the holder springs away from the blade, leaving it free to be turned to other positions. A screw, passing through the part $a$ against the side of holder $h$, may be used for forcing the latter against the blade; but it would be inconveniently in the way.

Holder $h$ has an angle-stop for blade $c$, thereupon indicated by 5. Said angle-stop is so located that it will stop the blade at an angle of forty-five degrees to the stock, when, after swinging the blade slightly to carry groove $w$ out of line with the teeth 6, the holder $h$ is, as above described, made to spring against the blade and move stop 5 forward, so that the edge of the blade $c$ will strike it, thus setting the latter to said angle.

The part $a$ of the stock is provided with an indicator-socket at its rounded end, (see Fig. 6,) having an opening, $v$, through its side, and opposite said opening on the end of part $a$ is an indicator-line, 8. An angle-indicator, $n$, provided with graduation-lines 3 on its periphery, and a bar, $n^2$, across one side, is fitted into said socket in the part $a$ of the stock, its bar $n^2$ fitting into the slot in blade $c$, and screw $e$ passing through it and indirectly through the blade-slot. When the indicator $n$ and the blade $c$ are properly hung to oscillate in the end of the stock, the lines 3 on the periphery of said indicator are visible through the opening $v$ at the end of the stock, and, by turning the blade to bring one of lines 3 (either side of the center one) on a line with line 8 on the stock, the blade is brought to a certain angle of incline, which angle or angles may be marked by figures stamped at said lines, so that the operator can at once turn the blade to any desired angle of incline, the degree of which is indicated by the figures to accompany the said lines 3 on the indicator $n$.

The part $a'$ of the stock is provided with a pointed screw-rod, $d$, working in a tapped bar, $y$, and provided with a thumb-piece for turning it, as shown. The rounded end of the stock part $a'$ is provided with a lever and washer-socket, in the center of which rises the stud $e^2$. Into the bottom of said socket is fitted a circular lever, $m$, having an arm, $m^2$, on one edge, and having its central portion thickest, as shown in Fig. 2. Onto lever $m$ the washer $o$ is placed, one face of which bears flatly against the side of blade $c$.

The above-mentioned screw-rod $d$, lever $m$, and washer $o$, constitute the devices by which the blade $c$ is clamped in the stock and rigidly secured in any position to which it may be turned, as aforesaid, and said devices operate as follows: When the screw-rod $d$ is turned to draw its point away from under arm $m^2$ on lever $m$, the latter and washer $o$ drop away from the side of blade $c$, leaving it free to swing; but screwing rod $d$ forward and forcing its point under arm $m^2$ causes lever $m$ to be moved toward said blade, and its highest central position to be forced against washer $o$, pushing the latter against blade $c$, and clamping the latter tightly between the ends of the stock.

The construction of the lever $m$, with the arm $m^2$ thereon, gives increased power without increasing the general diameter of the lever, and making it highest in the center causes it to so bear against washer $o$, letting the latter rock thereon, as to permit the washer to come to a perfectly flat bearing against the side of blade $c$, and make such a frictional bearing thereagainst as to firmly hold the blade.

In setting blade $c$ to form a square, as in Fig. 1, the blade is turned nearly to that position. Plate $b$ is pushed toward the blade, making the teeth 6 on the holder $h$ engage in groove $w$ and swing the blade to a correct position. Screw $d$ is then forced under lever $m$, thus firmly securing the blade in position. To free the blade, retire screw $d$ from lever $m$ and slide back plate, $b$.

To provide a practicable level in connection with this tool, a suitable bubble-glass pocket is formed in one edge of the part $a'$ of the stock, in which is located a bubble-glass, D, of ordinary construction. (Shown in dotted lines in Fig. 3.)

What we claim as our invention is—

1. The combination, with the stock and blade of a bevel, of the circular angle-indicator $n$, having a bar, $n^2$, thereon to interlock with said blade, and having graduation-lines across its periphery arranged to be brought into coincidence with an indicator-line on the stock, substantially as set forth.

2. In combination, with the stock of a bevel, a blade having the usual slot therein, and provided with a groove near to and parallel with its edge, a vibratory blade-holder attached to said stock, and having teeth thereon to engage in said groove, and means, substantially as described, for operating said holder to engage it with and disengage it from said blade, substantially as set forth.

3. In combination with the stock and blade of a bevel, the vibratory blade-holder $h$, having the stop-pin 5 thereon, the plate $b$, and tongue $b^2$, substantially as set forth.

4. The combination, with the blade and stock of a bevel, of the pointed screw-rod $d$, the circular lever $m$, having arm $m^2$ thereon, and of greater thickness at its center than at its border, and the washer $o$, interposed between lever $m$ and the blade $c$, substantially as set forth.

5. In combination with the stock of a bevel and with the blade thereof, having a groove therein parallel with and near to one edge, the vibratory blade-holder $h$, having the stop-pin 5 and the teeth 6 thereon, and the tongue $b^2$ operative from outside the stock, substantially as set forth.

JAMES DUCKWORTH.
ELI SMITH.

Witnesses:
  H. A. CHAPIN,
  J. D. GARFIELD.